United States Patent [19]

Akatsuka

[11] Patent Number: 4,879,665
[45] Date of Patent: Nov. 7, 1989

[54] MEDICAL PICTURE FILING SYSTEM

[75] Inventor: Yuichiro Akatsuka, Hachioji, Japan

[73] Assignee: Olympus Optical Co., Ltd., Tokyo, Japan

[21] Appl. No.: 772,517

[22] Filed: Sep. 4, 1985

[30] Foreign Application Priority Data

Sep. 29, 1984 [JP] Japan .................. 59-202982

[51] Int. Cl.$^4$ .................................. G06F 15/42
[52] U.S. Cl. .................. 364/518; 364/413.02; 128/712
[58] Field of Search ........ 364/518, 521, 900 MS File, 364/200 MS File, 413, 414, 413.02, 413.03, 413.13, 413.15, 413.16, 413.19, 413.22; 340/700; 128/710, 712

[56] References Cited

U.S. PATENT DOCUMENTS

| | | | |
|---|---|---|---|
| 3,737,863 | 6/1973 | Rowland et al. | 364/200 |
| 3,774,158 | 11/1973 | Clark | 364/200 |
| 3,872,448 | 3/1975 | Mitchell, Jr. | 364/200 |
| 3,872,448 | 3/1975 | Mitchell, Jr. | 364/200 |
| 4,128,891 | 12/1978 | Lin et al. | 364/900 |
| 4,260,854 | 4/1981 | Kolodny et al. | 364/900 |
| 4,315,309 | 2/1982 | Coli | 364/200 |
| 4,347,568 | 8/1982 | Giguere et al. | 364/300 |
| 4,653,112 | 3/1987 | Ouimette | 364/413 X |
| 4,731,725 | 3/1988 | Suto et al. | 364/413 X |

FOREIGN PATENT DOCUMENTS 3311663 4/1982 Fed. Rep. of Germany .
2020455 12/1979 United Kingdom .

OTHER PUBLICATIONS

C. J. Date; *An Introduction to Database Systems*, 1981, Addison-Wesley, esp. 5.3.2 pp. 64–67; 54.1,4.2; 83–87; 54.5; 91–93; 572; 117–131.

*Primary Examiner*—Gary V. Harkcom
*Assistant Examiner*—H. R. Herndon
*Attorney, Agent, or Firm*—Armstrong, Nikaido Marmelstein Kubovcik & Murray

[57] ABSTRACT

A medical picture filing system according to the invention is composed of a picture data memory device, a picture data input-output device for inputting/outputting the picture data, a retrieving device for storing the picture data into the memory device and extracting it therefrom on the basis of retrieving data, a retrieving data input device for inputting the retrieving data into the retrieving device, a retrieving data storing device for storing the retrieving data, the retrieving data being classified by block of information obtained in one-time examination. When medical pictures are filed, retrieving data collected for each examination is utilized for reducing the amount of retrieving data, while when reproduced, retrieval is carried out for each one-time examination, thereby shortening the time required for retrieval.

11 Claims, 3 Drawing Sheets

MEDICAL PICTURE FILING SYSTEM

BACKGROUND OF THE INVENTION

This invention relates to a medical picture filing system for pictures obtained by means of an endoscope or the like.

Recently, a medical picture filing system has been developed as a link in the chain of a medical system, in which a large amount of pictures obtained by examinations are filed into a memory unit, and a desired picture to be used is taken out from the memory unit on the basis of retrieving data. This filing system has been utilized for controlling charts.

In this kind of medical picture filing system, the retrieving data is composed of a plurality of retrieving item data such as data concerning the name of a patient, gender, the date of birth, the date of examination, the name of a disease, the name of a diseased portion, and the name of the doctor in charge, and an address data representing the location in the memory unit where the picture data is stored in correspondence with the item data. Both of these data, constituting the retrieving data, are stored in a retrieving data storing portion.

Since the item data such as gender and date of birth are individual to each patient, classification of the retrieving data by patient and control thereof can realize a reduction in the amount of retrieving data and the retrieving time by compiling common items. For this reason, retrieving data are usually controlled in units, one unit including all the data for a single patient.

A method for retrieving medical picture data by using a display unit which is called World View/User View has been proposed, in which visual retrieval is conducted with respect to an abstract picture which is displayed in the world view and the result is displayed in the user view. In this case, since the range of retrieval must to some extent be narrowed down in advance at the time of retrieval in the world view, the picture data are also classified and controlled by patient, whereby the abstract picture of the relevant patient is displayed in the world view.

Recently, however, there has been a growing tendency to take a plurality of pictures during one medical examination, and especially in an examination using an endoscope, several tens of pictures are taken at one examination. When such a large number of pictures obtained at one examination are classified and controlled in accordance with a conventional medical picture filing system, it is necessary to attach to each picture retrieving item data such as the date of examination, the name of disease and the name of the doctor in charge, which are common to each picture at the time of the examination, before each picture is stored in the retrieving data storing portion. As a result, the amount of retrieving data to be stored becomes inconveniently bulky, and hence a long time is required for retrieval of the pictures on the basis of this retrieving data.

SUMMARY OF THE INVENTION

Accordingly, it is an object of the invention to eliminate the above-described defects of a conventional medical picture filing system and to provide a medical picture filing system which enables reduction in the amount of retrieving data and the time for retrieval.

To achieve this aim, a medical picture filing system according to, the invention is composed of a picture data memory device, a picture data input device for inputting the picture, data into the memory device, a retrieving device for storing the picture data into the memory device on the basis of retrieving, data and extracting the picture data from the memory device, a picture data output device for outputting the picture data extracted from the memory device, a retrieving data input device for inputting the retrieving data into the, retrieving device, and a retrieving data storing device for storing the retrieving data, and is characterized in that the retrieving data is so constructed as to be classified and controlled by a block of information obtained in one-time examination (hereinunder referred to as "one-time examination").

The above-described structure of the retrieving data enables the retrieving data to be classified for each individual examination, and the item data which are common to a plurality of picture data obtained at one examination to be controlled as the respective examination data thereof, thereby reducing the amount of retrieving data and the time for retrieval.

The above and other objects, features and advantages of the present invention will become clear from the following description of the preferred embodiments thereof, taken in conjunction with the accompanying drawings.

DESCRIPTION OF THE PREFERRED EMBODIMENTS

Figure 1:
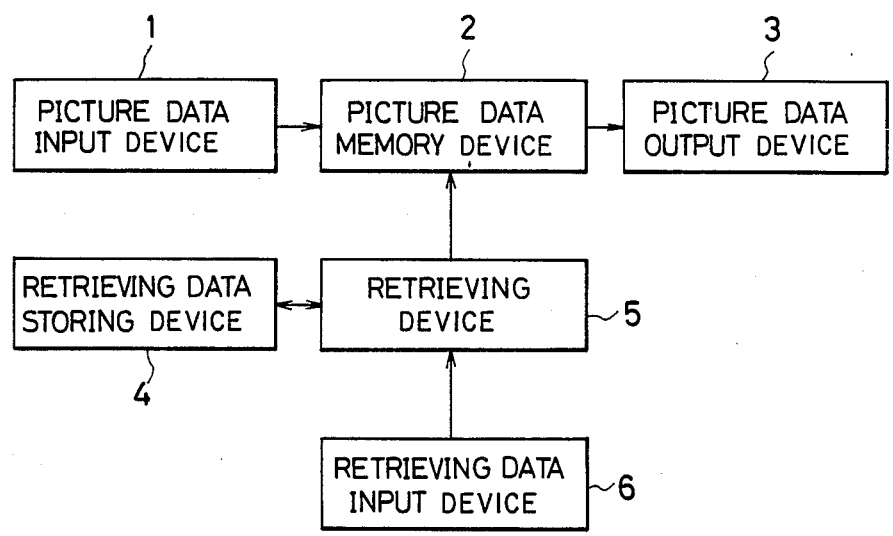
FIG. 1 is a block diagram of an embodiment of a medical picture filing system according to the invention.

An embodiment of this invention will be explained hereinunder. FIG. 1 is a block diagram of an embodiment of a medical picture filing system according to the invention. The referential numeral 1 denotes a picture input portion (or device), from which picture data of a medical picture is input and recorded into a memory device (or device) 2. An address of each picture data to be recorded in the memory portion 2 is determined by a retrieving portion (or device) 5, and the address is recorded in a retrieving data storing portion (or device) 4. At this time, retrieving data is input from a retrieving data input portion (or device) 6 and is recorded in the retrieving data storing device 4 together with the picture data address.

When the picture data which is recorded in the memory device 2 is extracted for reproduction, the retrieving data is input into the retrieving data input device 6, and data which corresponds to the input retrieving data is extracted by retrieving the data within the retrieving data storing device 4. Then, on the basis of the picture data address which has been recorded together with the extracted retrieving data, the picture data which corresponds to the address is read out from the picture data memory device 2, the output being displayed by the output portion (or device) 3.

Figure 2:
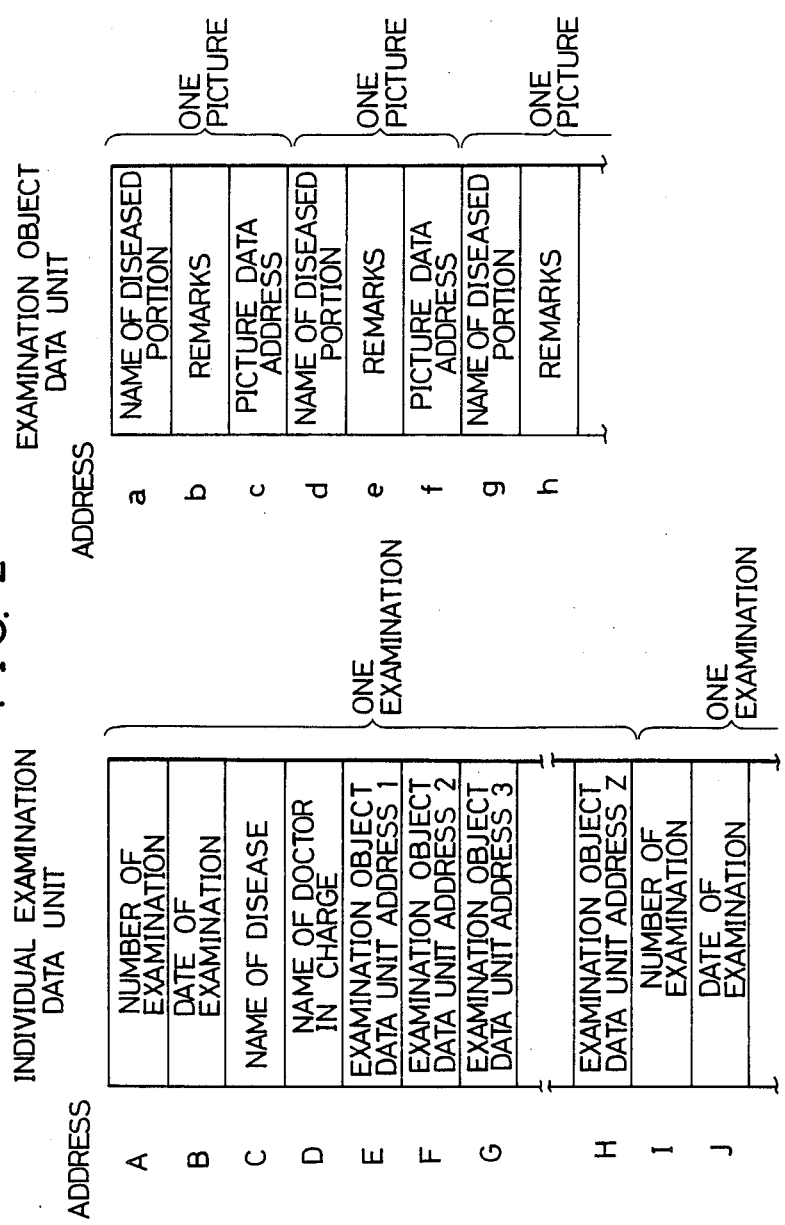
FIG. 2 shows an example of the structure of retrieving data.

The retrieving data which is to be recorded in the retrieving data storing device 4 will next be explained. As retrieving items, the following items shown in FIG. 2, are to be mentioned: the examination number, representing the reference number of an examination, the number being in series; the date of examination, representing the date when examination is carried out; the name of a disease; the name of the doctor in charge; the name of the diseased portion which is shown in the picture, remarks and address in the picture data memory device 2 where the picture data is recorded. Of these retrieving items, the data of the examination number, the date of examination, the name of the disease, and the doctor in charge, which are common to each series of pictures as taken a one-time examination, is controlled as an individual examination dat unit.

As is shown in FIG. 2, the one-time examination data unit consisting of the item data of the examination number, the date of examination, the name of disease, and the doctor in charge is ,stored in the address in the retrieving data storing device 4 which is physically and logically continuous. Thereafter the addresses of the storing location in the retrieving data storing device 4 of the data which are proper to an individual picture taken at the examination, such as the data on the name of the diseased portion, remarks, and picture data address (which are individually referred to hereinunder as "examination object data units"), are recorded as "examination object data unit addresses".

In the example shown in FIG. 2, an individual examination data unit, namely, the examination number, the date of examination, the name of disease, and the doctor in charge are recorded into the addresses A to D, respectively, of the retrieving data storing device 4 and in the subsequent addresses E to H, the storage addresses to Z of all examination object data units are recorded. For example, the examination object data unit address 1 is allotted to the address a in the retrieving data storing device 4 and the examination object data unit address 2 to the address d. Each examination object data unit includes the addresses in the picture data memory device 2 where picture data are stored, as is described above.

When a desired picture is reproduced in the medical picture filing device in which retrieving data has the above-described structure, retrieving data corresponding to the desired, picture is input from the retrieving data input device 6, whereby the individual examination data unit corresponding to the input retrieving data is first, extracted from the, retrieving data storing device 4 by the retrieving device 5. The examination object data unit with the retrieving item data corresponding to the retrieving data is next retrieved from among the plurality of examination object data units which correspond to the plurality of examination object data unit addresses included in the extracted individual examination data units. On the basis of the picture data address included in the retrieved and extracted examination object data unit, the picture data corresponding to the address is then read out and finally output and displayed by the output device 3.

As described above, retrieving data which is attached to picture data to be input to the picture data memory device 2 from the picture input device 1 is classified by one-time examination in accordance with the invention, as described above, and data of those items which are common to a series of pictures taken at one examination are collected and stored as examination unit data instead of being separately attached to each picture and stored. In this way the amount of retrieving data can be greatly reduced.

When retrieving, only one retrieval is sufficient for an individual examination data unit in relation to a series of pictures obtained at one examination, and subsequently the picture data of the examination object data unit corresponding to that of the retrieving data is extracted from among all the pictures of the individual examination data unit corresponding to that of the retrieving data. Thus, reduction in the time for retrieval is enabled.

In this embodiment, the retrieving data is classified by the one-time examination, is separated into an individual examination data unit and an examination object data unit and is stored in the retrieving data storing device 4.

A method of classifying and controlling retrieving data by the one-time examination in accordance with the invention can be used together with a method of classifying the retrieving data by patient. That is, it is possible to first classify the retrieving data by patient and further to classify the classified data by the one-time examination.

Figure 3:
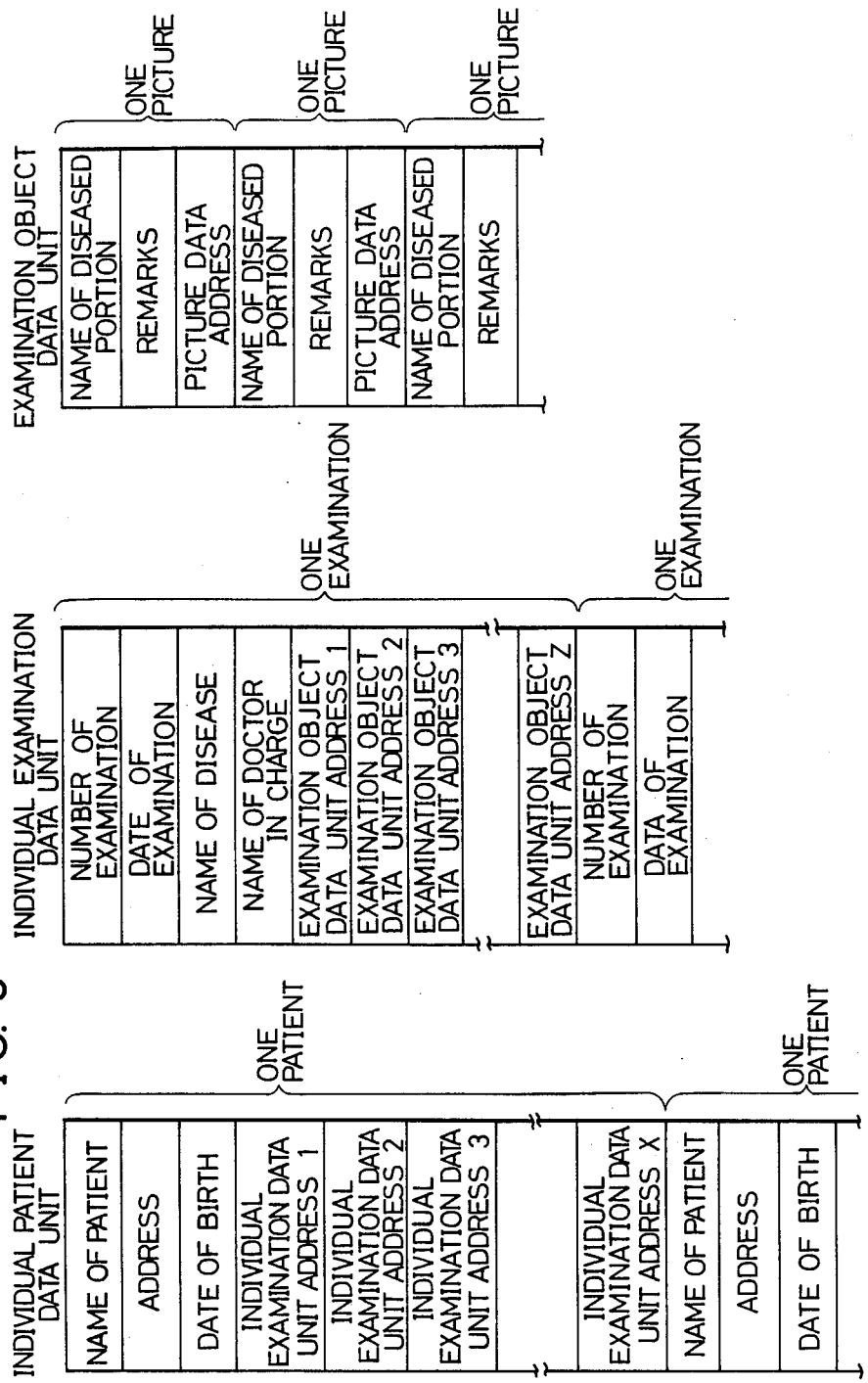
FIG. 3 shows another example of the structure of retrieving data.

In this case, as is shown in FIG. 3, the common item data of the name of the patient, the address and the date of birth are controlled as an individual patient data unit, and the addresses of the storage location of individual examination data units which are classified by the one-time examination are recorded in an individual patient data unit storage region together with the individual patient data units.

On the other hand, in the individual examination data unit storage region, individual examination data units consisting of the common item data of the examination number, date of examination, name of disease, and name of doctor in charge, as well as the addresses of the examination object data units which are proper to the plurality of pictures obtained at each examination, are recorded.

Retrieval is more efficiently effected by classifying the retrieving data not only by the one-time examination but also by patient and by storing and controlling their common item data as an individual patient data unit and an individual examination data unit in this way.

In each of the above-described embodiments, a method of storing retrieving data in the case of classifying and controlling the retrieving data is described. That is, for of classifying the retrieving data by the one-time examination, an individual examination data unit and an examination object data unit are stored in divided storage regions separately from each other, and for the case of classifying the retrieving data both by patient and by the one-time examination, an individual patient data unit, the individual examination data unit and the examination object data unit are stored in divided regions separately from one another. However, as for a retrieving data storing method, various modified storing methods will be mentioned, for example, the method of attaching an identifier to each of the data units for identifying each of the data units, storing each data subsequently in the retrieving data storage region without dividing the storage region.

In the case of storing each data unit with an identifier attached thereto, for example, when the data is classified and controlled by the one-time examination, as is shown in FIG. 2, identifiers are attached to the portion where the addresses 1 to Z of examination object data units are stored and thus the examination object data units are directly stored. Though the retrieving speed is slightly lowered in this case, the storage range does not have any blank portion which would be generated in the case of storing each data unit in the divided regions, whereby the retrieving data storage portion can be utilized effectively.

While there has been described what are at present considered to be preferred embodiments of the invention, it will be understood that various modifications may be made thereto, and it is intended that the appended claims cover all such modifications as fall within the true spirit and scope of the invention.

What is claimed is:

1. A medical picture filing system for storage and retrieval of input picture data from a video signal, said medical picture filing system comprising;
   picture data input means for inputting said video signal representing said input picture data;
   picture data memory means connected to said picture data input means, said picture data memory means for storing said input picture data;
   retrieving means connected to said picture data memory means, said retrieving means for determining storage addresses for said picture data in said picture data memory means, said retrieving means for retrieving said picture data from said picture data memory means;
   retrieving data input means connected to said retrieving means, said retrieving data input means for receiving retrieving data input thereto, said retrieving data being information which describes said picture data;
   retrieving data storing means connected to said retrieving means, said retrieving data storage means for storing said addresses of said input picture data, said retrieving data storing means for storing said retrieving data about said input picture data input from said retrieving data input means; and
   picture data output means connected to said picture data memory means, said picture data output means for outputting said picture data from said picture data memory means when said picture data is retrieved from said picture data memory means by said retrieving means,
   wherein said retrieving data is formed as a block of information which is common to all input picture data obtained in a one-time examination.

2. A medical picture filing system according to claim 1, wherein said retrieving data is composed of an individual examination data unit, which is classified by said block of information obtained in said one-time examination, and examination object data unit, said examination object data unit being stored in correspondence with an examination object data unit address which is included in said individual examination data unit.

3. A medical picture filing system according to claim 2, wherein said individual examination data unit is composed of the data with respect to the reference examination number, the date of examination, the name of the disease, the name of the doctor in charge and a plurality of examination object data unit addresses.

4. A medical picture filing system according to claim 2, wherein said examination object data unit is composed of the data with respect to the name of the diseased portion, remarks and a picture data address.

5. A medical picture filing system according to claim 1, wherein said retrieving data is composed of an individual examination data unit, which is classified by said block of information obtained in said one-time examination, and examination object data unit, which is to be stored subsequently to said individual examination data unit, an identifier being attached to said examination object data.

6. A medical picture filing system according to claim 1, wherein said retrieving data is classified and controlled both by said block of information obtained in said one-time examination and by patient.

7. A medical picture filing system according to claim 6, wherein said retrieving data is composed of an individual patient data unit which is classified by patient, individual examination data unit which is stored in correspondence with an individual examination data unit address included in said individual patient data unit, and examination object data unit which is stored in correspondence with an examination object data unit address included in said individual examination data unit.

8. A medical picture filing system according to claim 7, wherein said individual patient data unit is composed of the data with respect to a name of said patient, address, a date of birth and a plurality of individual examination data unit addresses.

9. A medical picture filing system according to claim 7, wherein said individual examination data unit is composed of data with respect to a number of examination, a date of examination, a name of a disease, a name of doctor in charge and a plurality of examination object data unit addresses.

10. A medical picture filing system according to claim 7, wherein said examination object data unit is composed of data with respect to name of a diseased portion, remarks and a picture data address.

11. A medical picture filing system according to claim 6, wherein said retrieving data is composed of an individual patient data unit which is classified by patient, individual examination data unit which is stored subsequently to said individual patient data unit and examination object data unit which is stored subsequent to each of said individual patient data unit and individual examination data unit, an identifier being attached to said individual examination data unit and individual examination object data unit.

* * * * *